June 26, 1962 A. E. WOLFE, JR 3,041,585

DYNAMIC CLOCK RECORDER

Filed July 14, 1953 3 Sheets-Sheet 1

INVENTOR:
Albert E. Wolfe, Jr.

By Mason, Mason & Sheridan
Patent Attorneys

DYNAMIC CLOCK RECORDER

Filed July 14, 1953 3 Sheets-Sheet 2

INVENTOR:
Albert E. Wolfe, Jr.

By Mason, Mason & Sheridan
Patent Attorneys

June 26, 1962 A. E. WOLFE, JR 3,041,585

DYNAMIC CLOCK RECORDER

Filed July 14, 1953 3 Sheets-Sheet 3

INVENTOR:
Albert E. Wolfe, Jr.

By Mason, Mason & Sheridan
Patent Attorneys 3,041,585
Patented June 26, 1962

3,041,585

DYNAMIC CLOCK RECORDER

Albert E. Wolfe, Jr., Downey, Calif., assignor, by mesne assignments, to The National Cash Register Company, a corporation of Maryland Filed July 14, 1953, Ser. No. 367,934
11 Claims. (Cl. 340—174.1)

This invention relates to a means and method of recording a master timing channel on the periphery of a magnetic drum being used for a data storage device.

In digital computers it is highly desirable to use timing or clock signals generated in response to a permanent cyclical recording on the magnetic surface of a rotating storage drum to synchronize the actions of arithmetic electrical circuits operating on data being sensed from the drum.

It has previously been customary to record this master clock channel onto the magnetic storage drum by a manual process which utilizes a dividing head to mechanically divide the circumference of the drum into the desired number of segments. By this process, each time the index plate of the dividing head is manually stepped to a new position, a magnetic pulse is deposited onto the drum periphery by passing an electrical signal consisting of a single square wave through a stationary record head communicatively associated with the timing channel. This method has disadvantages in that, because of back-lash of the mechanism, for example, all the signals are not evenly recorded about the periphery of the drum. This causes the period of the played-back clock signals to vary to the extent that the electrical circuits cannot operate properly. In addition, this manual process does not readily lend itself to mechanically dividing the periphery of the drum into any arbitrary number of segments, and further it is time consuming.

Accordingly, one of the objects of this invention is to provide an electronic circuit for automatically recording a predetermined number of pulses about the periphery of a rotating member.

Another object of this invention is to provide a means and method of automatically recording a clock channel onto the periphery of a drum which is extremely fast, accurate, simple, and reliable.

Still another object of this invention is to provide means whereby an arbitrary number of pulses can be evenly recorded in a closed loop about the periphery of a magnetic drum without the requirement that the diameter of the drum be critical or even precisely known.

Other objects and advantages of the invention will be apparent from the specification and claims when considered in connection with the accompanying drawings in which:

Figure 1:
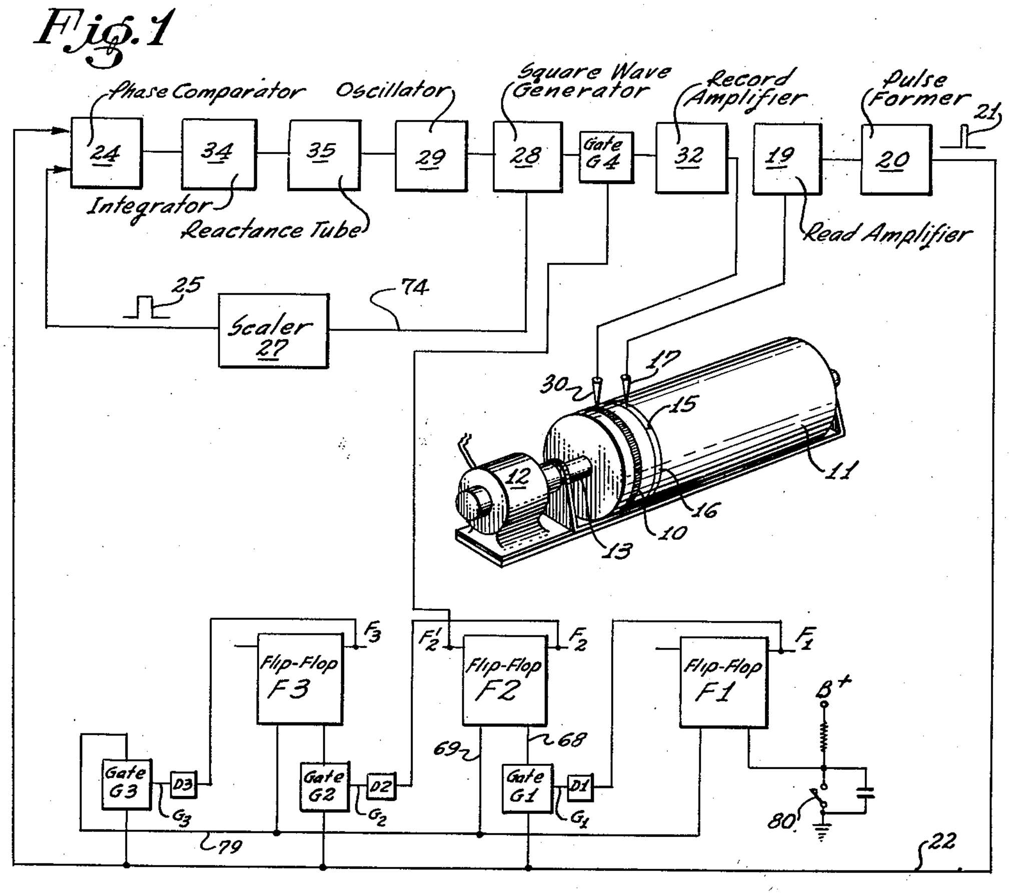
FIG. 1 is a diagram showing the overall system of the present invention.

Referring to FIG. 1, the system of the present invention will be generally described. Broadly, the electronic circuit shown operates to record an arbitrary number of evenly spaced clock signals on a channel 10 extending about the periphery of a magnetic memory drum 11 while the drum is being rotated by a motor 12 driving through drum shaft 13. When first setting up the equipment, a single pulse 15 is magnetically recorded on a reference channel 16 of the drum 11 by passing a momentary surge of current having a square waveform through a magnetic head 17 while the drum is stationary. During the recording operation, while the drum is rotating, magnetic head 17 responds to the magnetic pulse 15 once each revolution of the drum to generate a playback signal in the form of a single sine wave loop which is amplified by read amplifier 19 and fed to a pulse former circuit 20 which converts it into a relatively narrow reference pulse having a positive polarity, as shown by waveform 21. The detailed circuitry provided for forming this reference pulse will be described in the ensuing description in connection with FIG. 2.

The reference pulse 21 is fed by lead 22 into a phase comparator circuit 24. Also feeding into phase comparator circuit 24 is the end-carry pulse 25 from a scaler 27 which is energized by square pulses obtained from a square wave generator 28 driven by an oscillator 29.

The oscillator 29 is a sine wave signal generator whose circuit elements are adjustable to operate at a frequency varying between, say, 50 to 150 kc. These sine wave signals are converted by generator 28 into square wave signals which are the type to be recorded by way of a magnetic record head 30 stationarily mounted so as to be communicatively operable with the clock channel 10 on the drum 11.

During initial operation of the system, a gate G4 is closed so that the signals from generator 28 are inhibited from passing via record amplifier 32 onto magnetic record head 30. Gate G4 is controlled by an initiating circuit to be later described. The signals from generator 28 are continually fed, however, into scaler 27 which functions to divide the frequency of these signals by an amount corresponding to the number of square wave signals, i.e., clock signals, selected to be recorded in a closed loop about channel 10 of the drum. As will be noted in the ensuing description, the division which is obtained by scaler 27 is made adjustable such that a wide range of number of pulses may be arbitrarily selected to be recorded onto the clock channel 10.

The period between successive end-carry pulses 25, as received by the phase comparator 24 from the scaler 27. corresponds to the time during which the desired number of signals to be recorded onto the drum 11 is generated by the oscillator 29.

On the other hand, the period between successive reference pulses 21, as generated by the drum 11, corresponds to the time during which a point on the drum makes one revolution. In other words, this latter period corresponds to the time required for the length of the track, over which the periodic pulses are to be serially recorded, to pass the stationarily positioned record head 30.

It is to be appreciated that the time required for a point on the clock channel 10 on the drum to repass record head 30 is fixed by the motor 12, and thus the present circuit provides for altering the frequency of the oscillator 29 so as to generate the desired number of pulses within the time corresponding to a single revolution of the drum. The variation in frequency is determined by comparing the phase relation of the reference pulse 21 with the end-carry pulse 25 from the scaler 27, in the phase comparator 24. Any discrepancy is sensed as either a positive or negative D.C. output signal, depending on whether the frequency of oscillator 29 is too high or too low. This D.C. signal, after being passed through an integrator circuit 34, is fed into the grid of a reactance tube 35. Tube 35 is arranged to operate as a variable capacitance in the tank circuit of the oscillator 29 in that, depending on whether tube 35 conducts more or less current, it varies the output frequency of oscillator 29.

The circuits thus operate to maintain the frequency of oscillator 29 at such a point that the end-carry pulses 25 from scaler 27 are in phase with the reference pulses 21 as obtained from the drum 11.

Figure 2:
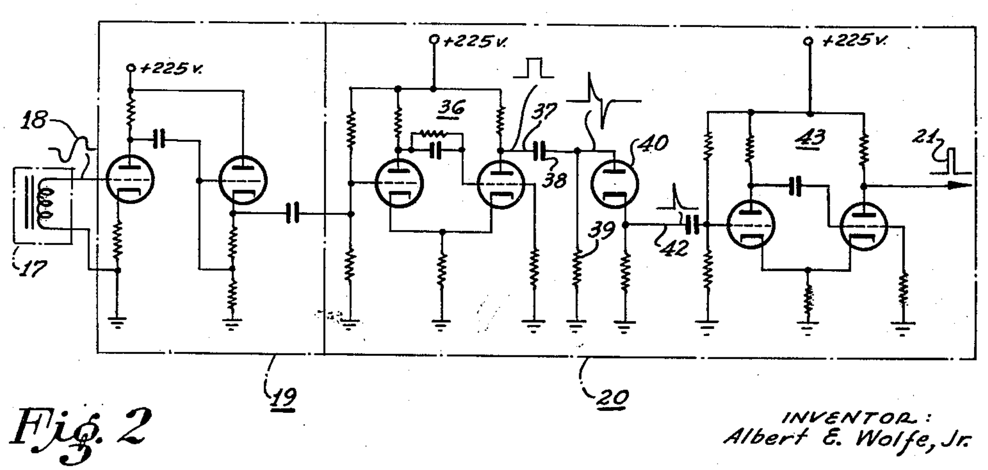
FIG. 2 is an electrical diagram of the reference pulse forming circuit.

The detailed circuit for generating the reference pulse 21 will next be described by referring to FIG. 2. The magnetic pulse 15 on channel 16 on the drum 11 induces a single sine wave loop 18 on the magnetic head 17 which is amplified in two-stage read amplifier 19. The low impedance signal taken from the cathode of the second stage of the amplifier 19 is then impressed on a Schmitt type triggering circuit 36 which is designed to respond to two voltage points of the sine wave loop to create a square pulse on output lead 37. This square pulse is differentiated by means of capacitor 38 and resistor 39 and the resulting pulses are then sent through a diode 40 oriented to pass only the positive pulse onto cathode output lead 42. This positive pulse is then used to trigger a one-shot multivibrator 43 whose timing network has been chosen to generate the rectangular pulse of short duration referred to as reference pulse 21.

Figure 3:
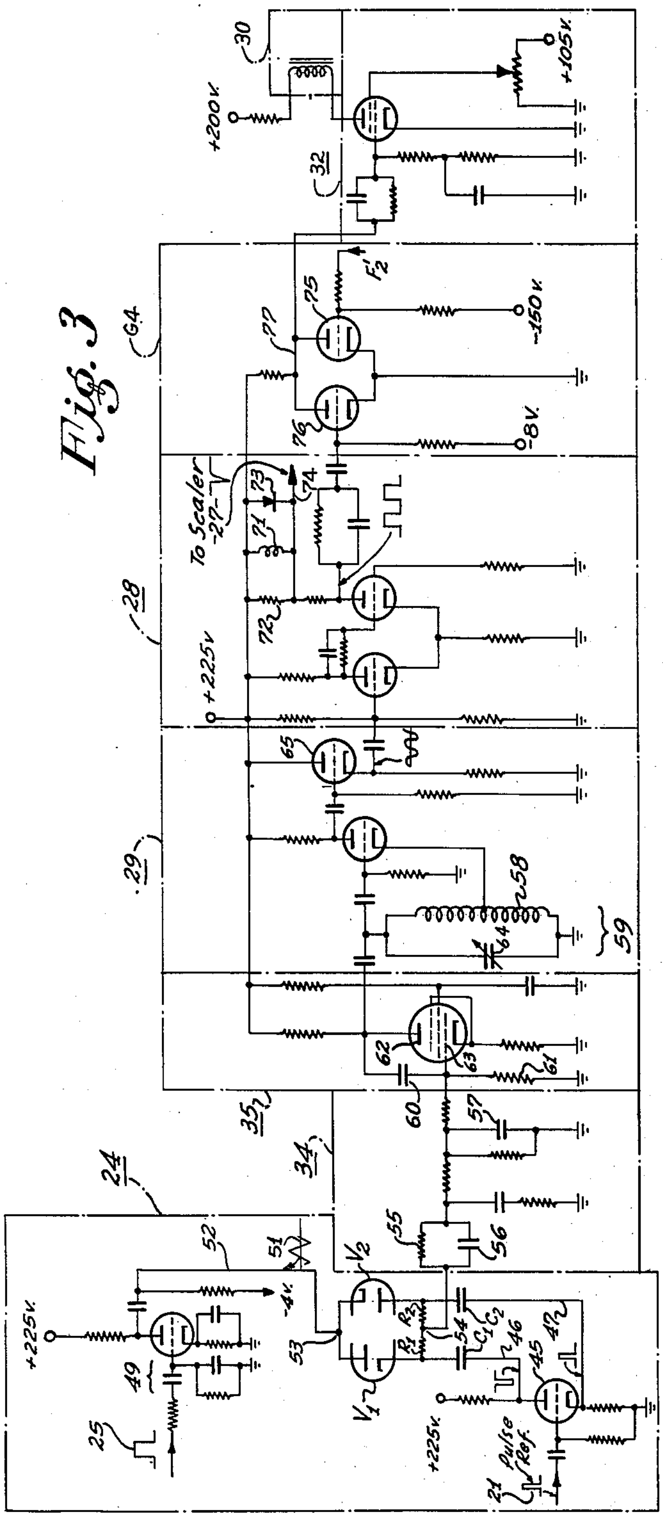
FIG. 3 is an electrical diagram of the circuit provided for adjusting the frequency of the oscillator used for generating the clock signals.

Referring next to FIG. 3, the circuit will be described which provides for enabling the phase of the reference pulse 21 and the end-carry pulse 25 to be compared by a pair of diodes $V_1$ and $V_2$.

The reference pulse 21, induced by magnetic pulse 15 recorded on channel 16 of the magnetic drum 11, is applied onto the diodes $V_1$ and $V_2$ by first feeding this pulse into phase splitter tube 45 which develops a negative polarity pulse on its plate circuit 46 and a positive polarity pulse on its cathode circuit 47. The plate circuit 46 is then connected to the cathode of diode $V_1$ through a coupling capacitor $C_1$, and the cathode circuit 47 is connected to the plate of diode $V_2$ through a coupling capacitor $C_2$.

On the other hand, the end-carry square pulse 25 from the scaler 27 is applied onto diodes $V_1$ and $V_2$ after being fed through a saw-tooth generating circuit 49 which integrates and amplifies the square pulse to produce a saw-tooth voltage waveform 51 on a lead 52 whose common junction 53 connects to the plate and cathode of diodes $V_1$ and $V_2$, respectively. The saw-tooth voltage 51 is thus applied in equal measure to each of the diodes. The phase comparator 24 now has all the waveforms needed to check the operating frequency of the end-carry pulse 25 from the scaler 27 against the frequency of the reference pulse 21 originating from the drum 11. The ouput of the phase comparator 24 is taken from a common point 54 joining two equal valued resistors $R_1$ and $R_2$ whose other ends are connected to the cathode and plate of diodes $V_1$ and $V_2$, respectively.

In operation of the phase comparator circuit 24, if no saw-tooth voltage appears on lead 52 when a reference pulse 21 is received; that is, if the saw-tooth voltage 51 is passing through its null point, diodes $V_1$ and $V_2$ conduct an equal amount and the voltage at common point 54 of resistors $R_1$ and $R_2$ is uneffected by the current flow. In other words, the D.C. voltage level of point 54 remains constant. This mode of operation represents the desired operating condition since it indicates the frequency of the reference pulses 21 and the scaler end-carry pulses 25 are in phase with each other.

Suppose, however, that the moment a reference pulse 21 arrives, the saw-tooth voltage waveform 51 is positive in potential. Under this condition, diode $V_1$ will simultaneously receive a negative polarity reference pulse on its cathode and a positive saw-tooth voltage on its plate. Thus diode $V_1$ will conduct more strongly than usual. At the same time, conduction through diode $V_2$ is reduced because the positive saw-tooth voltage on its cathode partially offsets the effect of the positive reference pulse applied to its plate. The diodes now are conducting a different amount and common point 54 of resistors $R_1$ and $R_2$ has a resulting higher positive D.C. voltage thereon.

Assume next that the reference pulse 21 arrives when the saw-tooth voltage waveform 51 is negative in potential. Now diode $V_2$ conducts more strongly than diode $V_1$ and, as a result, the unbalanced current flow through resistors $R_1$ and $R_2$ will lower the voltage level at common point 54.

It is seen, therefore, that the arrangement of $V_1$ and $V_2$ is a very sensitive phase discriminator and will develop a D.C. output voltage at point 54 which may be negative, zero, or positive, depending upon the phase of the reference pulses with respect to the end-carry pulses generated by the scaler 27.

In order to prevent spurious frequencies from affecting the operations of the circuits, the D.C. output voltage from phase comparator circuit 24 is passed through an integrator circuit 34 consisting of resistor 55 in parallel with capacitor 56, and a low pass filter capacitor 57. This D.C. voltage is then applied to the control grid 63 of reactance tube 35 causing the current through the tube to vary. The plate 62 of this tube has an A.C. voltage applied to it since it is connected across the tank circuit 59 of the oscillator 29. The tube 35 is further provided with a small capacitor 60 connecting the plate 62 of the tube to its control grid 63, together with resistor 61 connecting control grid 63 to ground. This arrangement causes the current flowing through tube 35 to lead the applied voltage. Consequently the plate current that the reactance tube 35 feeds into tank circuit 59 will be a capacitive current, causing the tube to appear as a condenser shunted across inductor 58.

The amount of capacitance injected in this manner into the oscillator tank circuit 59 will depend upon the amount of plate current flowing through tube 35. Thus a lower D.C. voltage level at the control grid input of tube 35 causes the frequency of oscillator tank circuit 59 to increase, whereas a higher D.C. voltage level causes the oscillator frequency to decrease. In this way, the oscillator frequency is instantly counteracted to maintain the oscillator 29 at the desired operating frequency. The integrator circuit 34 functons to allow only the relatively slow changes in frequency, caused by differences between the divided oscillator frequency as obtained from the scaler 27 and the incoming reference pulses 21, to reach reactance tube 35.

The output of oscillator 29 is developed as a sine wave on the cathode of an isolating tube 65 and then impressed on a Schmitt triggering circuit functioning as square wave generator 28.

The output of the square wave generator 28 is used to drive the scaler 27 and the gate G4. However, before being routed to the scaler 27, the square waveform on the plate circuit of the square wave generator 28 is differentiated by selecting the value of inductor 71 so that a short time constant is formed with the plate resistor 72. The differentiated waveform developed is then passed through diode 73 which clips the positive pulses permitting only the negative pulses to pass onto lead 74 connected to scaler 27.

Figure 4:
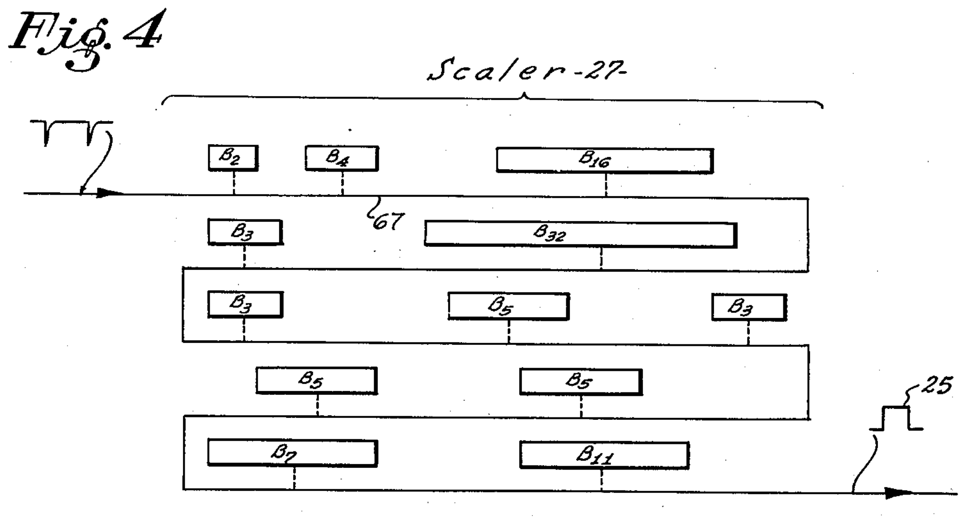
FIG. 4 is a diagrammatic illustration of the variable scaler.

As noted in the diagram, FIG. 4, the scaler 27 is comprised of various subscalers, such as $B_2$, $B_4$, $B_{16}$, $B_3$, $B_{32}$, etc. These circuits are shown in block form as they are conventional binary divider or counter circuits well known in the computer art. The rate division obtained by each subscaler is equivalent to the subscript by which it is designated, and the subscalers are provided so as to enable the overall division of the oscillator frequency to be varied by properly introducing the subscalers across the main line 67.

Figure 5:
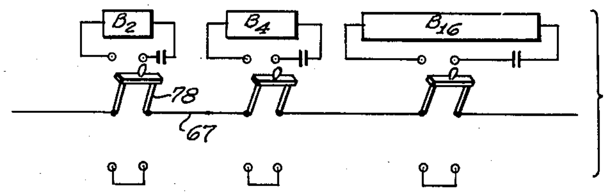
FIG. 5 is a schematic diagram showing the switching circuits for the variable scaler.

FIG. 5 shows diagrammatically how each of the subscalers may be connected into the main line 67. Each of the subscalers has a double pole-double throw switch 78, such as that shown for subscaler $B_2$. When switch 78 is thrown upward, the terminals of the subscalers are connected across the main line 67 so as to divide the incoming pulses by the value of the subscaler. When switch 78 is thrown downward, the terminals of main line 67 are shunted around the subscaler.

Assuming that it is desirable to record 2688 clock pulses about the clock channel 10 of drum 11, the scaler 27 is first set so that the overall division of the rate output of the oscillator is equivalent to 2688. That is, in order to provide an end-carry 25 from the scaler 27 every time 2688 pulses are generated by the square wave generator 28, the switches for the subscalers $B_3$, $B_4$, $B_7$, and $B_{32}$ are connected into the main line 67 in the manner above described, while the remaining switches are set such that the subscalers with which they are associated are by-passed. Thus note that this setting of the switches is equivalent to a rate division of $3\times4\times7\times32=2688$. Therefore, each time the scaler 27 receives 2688 pulses from the square wave generator 28, an end-carry pulse 25 is emitted which is fed to the phase comparator 24.

Having properly set the scaler 27, the tuning circuit 59 of the oscillator 29 is next adjusted by manually varying the setting of capacitor 64 such that the reference pulse 21 and the end-carry pulse 25 are approximately in phase with each other. In this way the circuits are brought within the range of frequency correction which can be made in the tuning circuit 59 of the oscillator by the reactance tube 35. This approximate manual setting may be obtained by reference to a calibration chart or by use of an oscilloscope which serves to visually align the phase relation of the pulses, for example. After making the rough manual frequency adjustment the reactance tube 35 then takes over and automatically corrects and maintains the frequency of the oscillator 29 so that the proper number of pulses set up by the scaler 27 is generated during the precise period equivalent to a single revolution of the drum 11 as determined by the temporal spacing of the reference pulses.

Having once reached a stable operation, the circuit of the present invention is now ready to be used for recording the clock pulses onto the clock channel 10 of the drum 11. The manually initiated start and stop circuits which precisely control the recording of the clock pulses on the drum will next be explained by reference to the circuit in FIG. 1, and the time chart in FIG. 6.

The flip-flop circuits, such as F2, represent well-known bistable state circuits, each having a pair of outputs on which high and low potential levels may be sensed in alternation, indicative of the state of the circuit. Thus when output $F_2$ of the F2 flip-flop has a relatively high potential thereon, and the $F_2'$ output therefrom has a relatively low potential thereon, the F2 flip-flop is in an "on" state. When in an "off" state, the outputs have opposite potential levels. Furthermore, each of flip-flop circuits, such as flip-flop F2, has a pair of trigger input leads 68 and 69, one of which controls each of its states. Thus a trigger pulse on input 68 of flip-flop F2 will trigger it into an "on" state, while a trigger pulse on input 69 will trigger it into an "off" state. The trigger inputs include differentiating and blocking circuits (not shown) which cause the flip-flop to be triggered by the leading edge of the trigger pulse.

Initially, all three flip-flops F1, F2, and F3 are in an "off" state corresponding to outputs $F_1$, $F_2$, and $F_3$ having relatively low potentials thereon. When in this condition, the high potential on the $F_2'$ output of the F2 flip-flop is routed to the grid of one of the triodes 75 in gate G4 (FIG. 3) comprised of triodes 75 and 76 connected in parallel. This high potential causes triode 75 to conduct heavily so that gate output line 77 connected to the plates of both the triodes has a low potential thereon. With triode 75 conducting heavily in this manner, the signals received on the grid of triode 76 from the square wave generator 28 are incapable of being sensed on gate output line 77.

Upon the closing of initiating switch 80, the flip-flop circuit F1 is triggered into an "on" state wherein the $F_1$ output is swung to a high potential. This high potential is delayed slightly in delay D1 comprised of a capacitor connected to ground, before opening gate G1, as noted by waveform $G_1$ in FIG. 6. This ensures that the instant reference pulse is not passed, but rather the next reference pulse is passed through gate G1 to trigger flip-flop F2 into an "on" state. At the precise moment output $F_2$ swings to a high potential, output $F_2'$ swings to a low potential, as noted in the chart of FIG. 6. This action, in effect, opens gate G4 since triode 75 no longer is conducting, and pulses impressed on the grid of triode 76 from square wave generator 28 are developed on the output line 77. These pulses are then amplified in record amplifier 32 and recorded by record head 30 onto clock channel 10 of the drum. On triggering the $F_2$ flip-flop into an "on" state, in addition to opening gate G4, the high output potential on $F_2$ is delayed slightly in delay circuit D2 before opening gate G2 to permit the next reference pulse to trigger flip-flop F3 into an "on" state. The high potential so obtained on output line $F_3$ is then delayed slightly in delay circuit D3 before opening gate G3 to pass the next reference pulse onto line 79 connected to the "off" triggering inputs of each of the F1, F2, and F3 flip-flops, thus triggering these flip-flops to an "off" state. The instant that the potential on the $F_2'$ output of the F2 flip-flop swings to a high potential, gate G4 is again closed, thus preventing any more pulses from being recorded on the clock channel.

Figure 6:
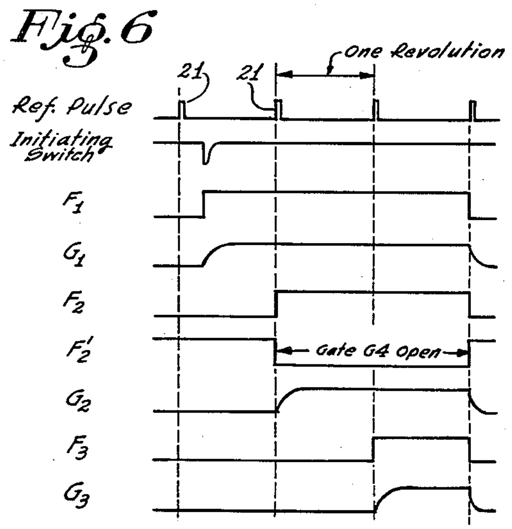
FIG. 6 is a time chart of the wave forms at various points of the initiating circuit.

As noted in the timing chart of FIG. 6, the pulses are recorded on the clock channel 10 for two revolutions of the drum. This is done to ensure complete closure of the clock pulses around channel 10 of the drum 11.

While the circuits as shown and described herein are admirably adapted to fulfill the objects and features of advantage previously enumerated as desirable, it is to be understood that the invention is not to be limited to the specific features shown but that the means and construction herein disclosed are susceptible of modification in form, proportion, and arrangement of parts without departing from the principle involved or sacrificing any of its advantages, and the invention is therefore claimed in embodiments of various forms all coming within the scope of the claims which follow.

What is claimed is:

1. A circuit for recording a predetermined number of timing signals about the periphery of a rotatable storage drum comprising means for sensing a reference pulse provided on the surface of said drum; an oscillating circuit; a scaler for generating an end-carry pulse upon receiving a number of pulses from said oscillating circuit equal to said predetermined number; means for comparing the phase relation of said end-carry pulses with said reference pulses and generating an error signal representative of phase-difference; means utilizing said error signal to correct the frequency of said oscillating circuit; and means for recording pulses generated by said oscillating circuit onto a channel of said drum; whereby said predetermined number of signals are evenly recorded in a closed loop about the periphery of said drum.

2. A circuit for recording timing pulses on a rotating storage drum comprising means for sensing a reference pulse provided on the surface of said drum; an oscillator circuit; a variable scaler capable of being set to generate an end-carry pulse upon receiving a number of pulses from said oscillator circuit equal to the number of timing pulses to be recorded about the surface of said drum; means for manually varying the frequency of said oscillator circuit so that the end-carry pulses are approximately in phase with said reference pulses; servo means comparing the phase relation of said end-carry pulses with said reference pulses to generate an error signal and including means responsive to the error signal for precisely adjusting and maintaining the phase relation of said pulses by automatically correcting the frequency of said oscillator circuit; and means for recording pulses from said oscillator circuit onto the surface of said drum.

3. A circuit for recording timing signals about a rotating drum comprising means for generating a reference signal once each revolution of said drum; recording means capable of being positioned for recording signals circumferentially about said drum; an oscillating circuit for generating signals to be impressed upon said recording means; a counter responsive to signals from said oscillating circuit for generating an end-carry signal upon receiving a predetermined number of signals; means for phase comparing the reference signals with the end-carry signals; means responsive to the phase-comparing means for altering the frequency of said oscillating circuit so as to equalize the frequency of said end-carry signals and said reference signals; and means gating the signals generated by said oscillating circuit to said recording means for at least one complete revolution of said drum.

4. A circuit for recording signals on a channel of a rotating member comprising means for sensing periodic reference signals proportional to the rotation of said member; an oscillator; means for dividing signals generated by said oscillator by the number of signals to be recorded between periodic signals received from said rotating member; a phase detector for comparing the phase relation of said divided signals with said reference signals; means responsive to the output of said phase detector to vary the frequency of said oscillator; and means including independently initiated gating means operable in response to said reference signals for recording signals generated by said oscillator onto a timing signal track extending circumferentially about the periphery of said rotating member.

5. A circuit for recording a timing signal channel on a rotating drum, comprising: means for generating reference signals proportional to the rotation of said drum; an oscillator for generating signals to be recorded onto said drum; a scaler for generating an end-carry signal after receiving a number of signals from said oscillator equal to the number of signals to be recorded onto said drum; means for comparing the phase relation of said end-carry signals with said reference signals, means for altering frequency of said oscillator in response to the phase comparison so as to adjust the phase relationship of said end-carry and reference signals; and means controlled by said reference signals for recording the output pulses from said oscillator as a regularly formed signal pattern onto the timing signal channel of said drum.

6. A circuit for recording a timing signal channel on a rotating storage device, comprising: means for generating reference pulses proportional to the rotation of said storage device; an oscillating circuit for generating pulses to be recorded onto said storage device; a variable scaler capable of being set to generate an end-carry pulse upon receiving a number of pulses from said oscillating circuit equal to the number to be recorded onto said storage device; means for manually varying the frequency of said oscillating circuit to bring the end-carry pulses approximately into phase with said reference pulses; means for comparing the phase relation of said end-carry pulses with said reference pulses, means for automatically altering the frequency of said oscillating circuit in response to the phase comparison so as to adjust and maintain the phase relationship of said pulses; and means responsive to said reference pulses for controlling the recording of output pulses generated by said oscillating circuit onto said storage device.

7. A circuit for generating signals to be recorded on the surface of a rotating member, comprising: means for sensing periodic reference signals proportional to the rotation of said member; a generator for generating signals to be recorded onto said member; a frequency divider for dividing the output signals from said generator; a phase comparator for generating a D.C. signal proportional to the phase variation of said refrence signals and the divided frequency output signals; means responsive to said D.C. signal to vary the frequency of said generator; gating means connected to the output of said generator; an initiating circuit responsive to the reference signals for determining the period said gating means is open, whereby signals to be recorded onto said rotating member are sensed on the output of said generator; and means for transducing signals gated by said gating means to such a rotating member.

8. Apparatus for recording a timing signal on a rotating drum comprising a signal source, means for recording a signal on the rotating drum and for reading the recorded signal, means for varying the time relationship between the recorded signal and selected signals from said signal source, means for sensing synchronism between said recorded signal and said selected signals, and means responsive to said signal source and at least one of the reproductions of the recorded signals for recording a timing signal on said rotating drum when synchronism occurs.

9. Apparatus for recording a timing signal on a rotating drum, comprising, a signal source, means for recording a signal in a first channel on the rotating drum and for reading the recorded signal, means for varying the relationship of the frequency of a reproduction of the recorded signal and the frequency of said signal source, means for sensing a predetermined relationship between said reproduction of the recorded signal and a signal from said signal source, and means for recording a timing signal in a second channel on said rotating drum when said predetermined relationship occurs, said means for recording the timing signal including a timing means controlled by a recording-initiating signal for rendering this recording means operable for a predetermined period of time following the initiation of the operation thereof.

10. Apparatus for recording a timing signal on a rotating drum, comprising a signal source, means for recording a signal on the rotating drum and for reading the recorded signal, means for varying the relative operative frequency of said signal source and said rotating drum one with respect to the other, means for sensing a predetermined relationship between the operative frequencies of the signal source and the drum, and means responsive to said signal source and at least one of the reproductions of the recorded signal for recording a timing signal on said rotating drum when said predetermined relationship occurs.

11. The method of forming a timing track on a rotating magnetic drum, which includes the steps of writing a sampling pulse on a recording track of the drum; reading said sampling pulse as the drum rotates; generating pulses by an external source; synchronizing a pulse frequency derived from the external source with the operative frequency of rotation of the drum by comparison of said pulse frequency with a pulse frequency derived from the reading of said sampling pulse; and recording pulses at the synchronized frequency on a separate recording track of the drum in response to at least one of the pulses derived from the reading of said sampling pulse.

References Cited in the file of this patent

UNITED STATES PATENTS

| | | |
|---|---|---|
| 1,888,721 | Goldsborough | Nov. 22, 1932 |
| 2,250,284 | Wendt | July 22, 1941 |
| 2,258,677 | Dresser | Oct. 14, 1941 |
| 2,399,421 | Artzt | Apr. 30, 1946 |
| 2,587,532 | Schmidt | Feb. 26, 1952 |
| 2,609,439 | Marshall | Sept. 2, 1952 |
| 2,614,169 | Cohen et al. | Oct. 14, 1952 |
| 2,647,996 | Greenfield | Aug. 4, 1953 |
| 2,652,554 | Williams et al. | Sept. 15, 1953 |
| 2,801,407 | Lubkin | July 30, 1957 |

OTHER REFERENCES

"Television Engineering," Fink, 1952.

UNITED STATES PATENT OFFICE

CERTIFICATE OF CORRECTION

Patent No. 3,041,585 June 26, 1962

Albert E. Wolfe, Jr.

It is hereby certified that error appears in the above numbered patent requiring correction and that the said Letters Patent should read as corrected below.

Column 4, line 58, for "functons" read -- functions --; column 6, line 35, for "$F_2$" read -- F2 --; column 7, line 62, for "signals," read -- signals; --; column 7, line 63, after "altering" insert -- the --; column 8, line 6, for "pulses," read -- pulses; --; line 20, for "refrence" read -- reference --.

Signed and sealed this 23rd day of October 1962.

(SEAL)
Attest:

ERNEST W. SWIDER
Attesting Officer

DAVID L. LADD
Commissioner of Patents